United States Patent
Elian

(10) Patent No.: US 9,631,997 B2
(45) Date of Patent: Apr. 25, 2017

(54) APPARATUS FOR MEASURING A PRESSURE, A METHOD FOR MANUFACTURING AN APPARATUS FOR MEASURING A PRESSURE AND A BATTERY

(71) Applicant: Infineon Technologies AG, Neubiberg (DE)

(72) Inventor: Klaus Elian, Alteglofsheim (DE)

(73) Assignee: Infineon Technologies AG, Neubiberg (DE)

( * ) Notice: Subject to any disclaimer, the term of this patent is extended or adjusted under 35 U.S.C. 154(b) by 590 days.

(21) Appl. No.: 13/893,970

(22) Filed: May 14, 2013

(65) Prior Publication Data
US 2014/0342203 A1 Nov. 20, 2014

(51) Int. Cl.
G01P 15/08 (2006.01)
G01L 19/00 (2006.01)
G01L 19/14 (2006.01)

(52) U.S. Cl.
CPC ........ G01L 19/0069 (2013.01); G01L 19/147 (2013.01); G01L 19/148 (2013.01)

(58) Field of Classification Search
USPC .......................... 257/417, 415, 418, 253, 254
See application file for complete search history.

(56) References Cited

U.S. PATENT DOCUMENTS

2013/0270660 A1* 10/2013 Bryzek .................. H01L 29/84
257/418

OTHER PUBLICATIONS

Pouch Cell—Small but not Trouble Free—Battery University, pp. 1-3, dated May 13. 2013, as available at http://batteryuniversity.com/learn/article/pouch_cell_small_but_not_trouble_free.
Lee. Chang-Chun, *Packaging Effect Investigation CMOS compatible Pressure Sensor Using Flip Chip and Flex Circuit Board Technologies*, Oct. 6, 2004, pp. 48-55, available online at www.sciencedirect.com.
Sensirion, The Sensor Company, *Datasheet SHT7x: Humidity and Temperature Sensor IC*, 12 pages, Version 5, Dec. 2011.
Zampolli, S. *Integration of Gas Sensors in Flexible Circuits: Towards a Flexible Tag Microlab for Food Logistics.* 2 pages.
Solar-Sicherheit.de , *Lithium-Eisenphosphat-akku*, as available at -http://solar-sicherheit.de/2009-ecartec4/gaia1.htm, 2 pages including google translation.

* cited by examiner

*Primary Examiner* — Timor Karimy
(74) *Attorney, Agent, or Firm* — Schiff Hardin LLP

(57) ABSTRACT

An apparatus for measuring a pressure includes a semiconductor die and a circuit board. The semiconductor die includes a micro-mechanical element generating a measurement signal indicating information on an external pressure applied to the micro-mechanical element. The semiconductor die further includes an output interface providing the measurement signal. The circuit board includes at least one electrically-conductive line and an opening. The semiconductor die is attached to the circuit board, so that the micro-mechanical element faces the whole of the circuit board and the at least on electrically-conductive line is connected to the output interface.

10 Claims, 8 Drawing Sheets

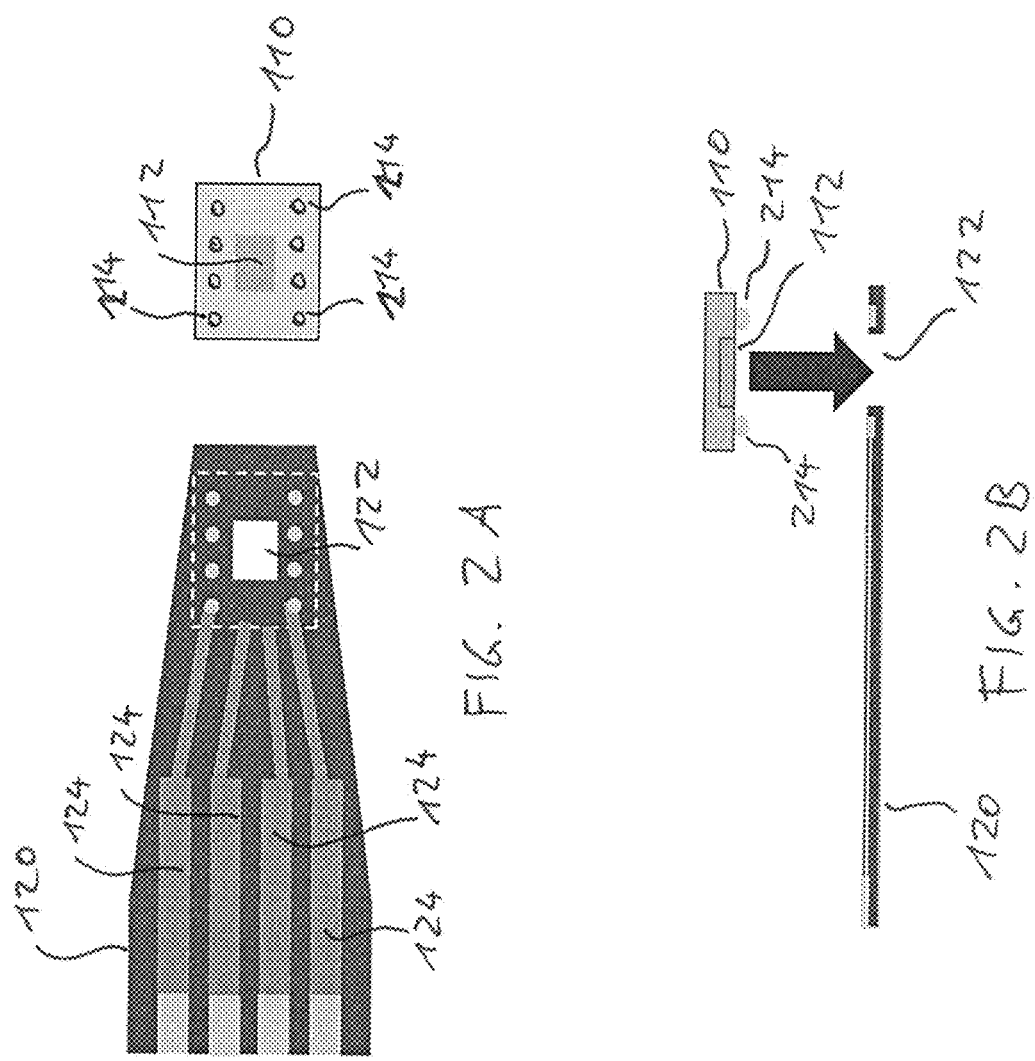

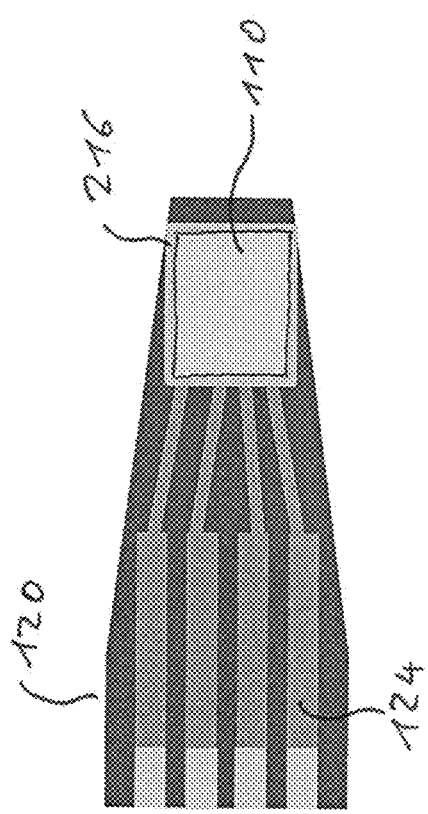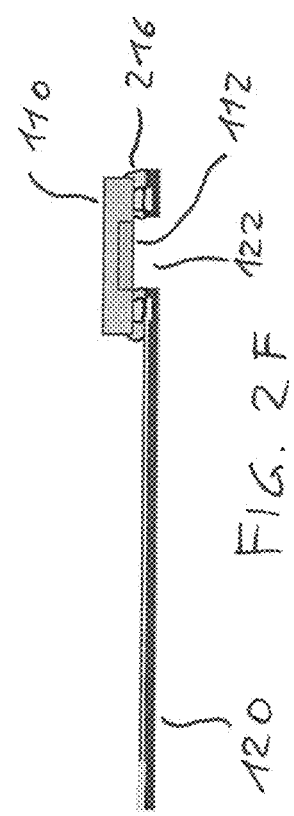

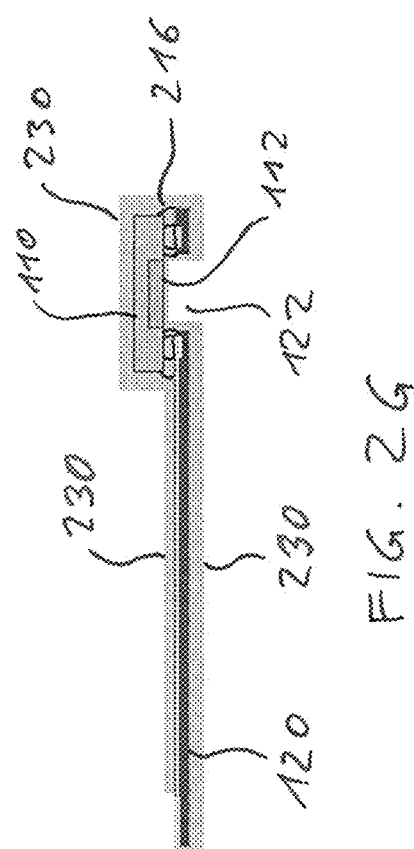

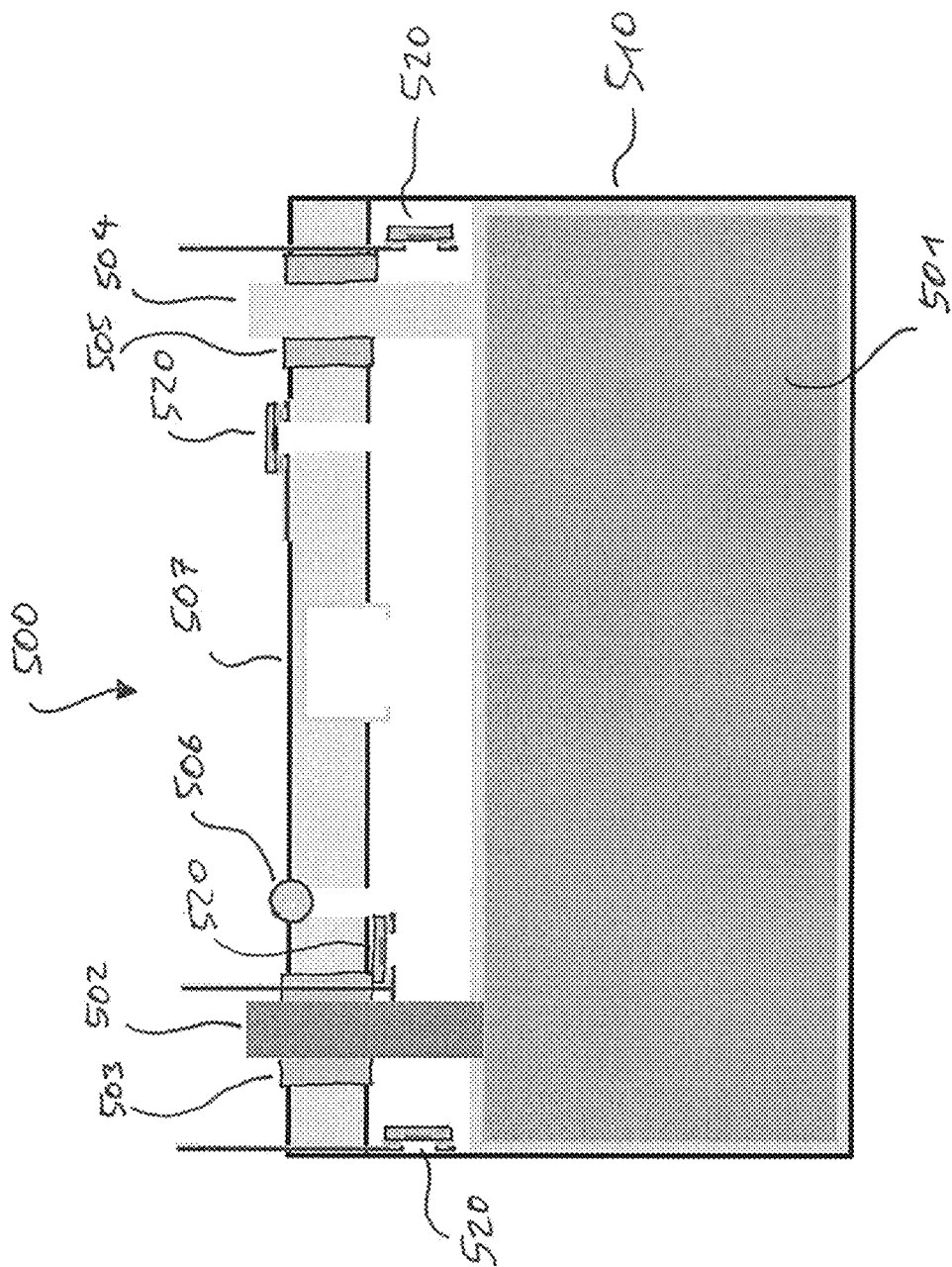

APPARATUS FOR MEASURING A PRESSURE, A METHOD FOR MANUFACTURING AN APPARATUS FOR MEASURING A PRESSURE AND A BATTERY

TECHNICAL FIELD

Embodiments relate to the field of pressure measurement and more particularly to an apparatus for measuring a pressure, a method for manufacturing an apparatus for measuring a pressure and a battery.

BACKGROUND

The measurement of environmental pressures is an important task for many applications today. Depending on the application, the pressure measurements have to be performed under widely varying conditions. Some applications take place under relaxed environmental conditions. Others are performed in a very rough or harsh environment with respect to temperature, pressure and/or the presence of chemically-reactive substances. Under such difficult conditions, the life cycle of a device and/or the reliability of a device may suffer.

SUMMARY

An embodiment relates to an apparatus for measuring a pressure comprising a semiconductor die and a circuit board. The semiconductor die comprises a micro-mechanical element configured to generate a measurement signal indicating information on an external pressure applied to the micro-mechanical element. The semiconductor die comprises an output interface configured to provide the measurement signal. Further, the circuit board comprises at least one electrically conductive line and an opening. The semiconductor die is attached to the circuit board so that the micro-mechanical element faces the opening of the circuit board and the at least one electrically conductive line is connected to the output interface.

By attaching or fixing the semiconductor die upside down on the circuit board (e.g. in a flip chip configuration), the active side of the semiconductor die can be better protected from rough environmental conditions than in other configurations. Therefore, the lifetime and/or the reliability of the device can be increased. Further, the semiconductor die can be easily connected to the electrically-conductive line due to the upside time configuration. Nevertheless, the external pressure can still be applied to the micro-mechanical element of the semiconductor die due to the opening of the circuit board.

In some embodiments, the circuit board is a flexible circuit board with a thickness of less than 500 μm. The flexible circuit board can be easily adapted to different geometries so that a pressure can be measured also at difficulty accessible locations.

Some embodiments relate to an output interface of the semiconductor die comprising at least one connecting element electrically connecting the semiconductor die and the at least one electrically conductive line of the circuit board. This at least one connecting element is surrounded by an underfill material resisting the environmental conditions in a field of application of the apparatus more than 100 times longer than a material of the connecting element. In this way, at least the connecting element can be better protected from destructive environmental influences.

Some embodiments relate to a battery comprising a hermetically-sealed or sealable enclosure and an apparatus for measuring a pressure within the enclosure. The apparatus is located inside the enclosure.

By placing the apparatus for measuring a pressure inside the battery enclosure, an increase of the pressure inside the enclosure (e.g. due to erroneous behavior) can be detected very early. Consequently, counter measures can be started also very early to avoid a destruction of the battery and/or the safety of usage can be improved.

BRIEF DESCRIPTION OF THE DRAWINGS

Some embodiments of apparatuses and/or methods will be described in the following by way of example only, and with reference to the accompanying figures, in which

FIG. 1b shows a schematic illustration of a top view of the apparatus for measuring a pressure shown in FIG. 1a;

FIGS. 2a to 2g show a schematic illustration of a manufacturing process for an apparatus for measuring a pressure;

FIG. 5 shows a schematic illustration of another battery.

DETAILED DESCRIPTION

Various example embodiments will now be described more fully with reference to the accompanying drawings in which some example embodiments are illustrated. In the figures, the thicknesses of lines, layers and/or regions may be exaggerated for clarity. Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
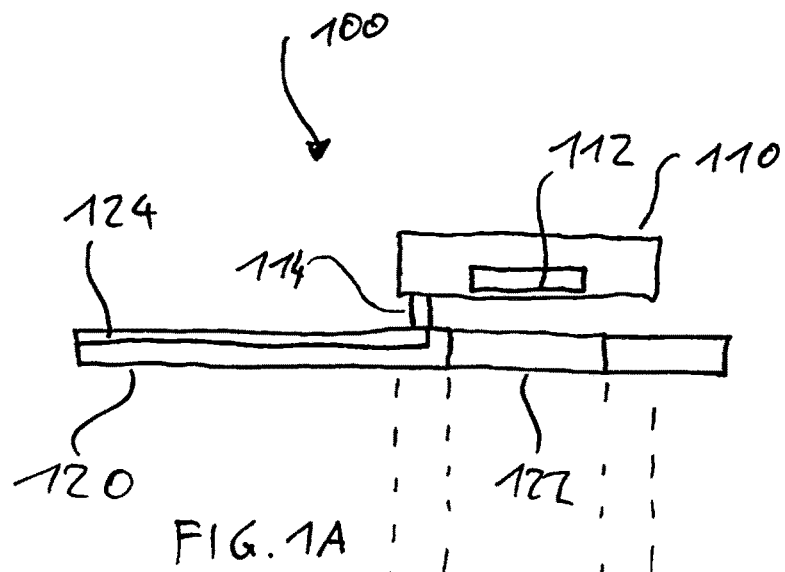
FIG. 1a shows a schematic illustration of a cross-section of an apparatus for measuring a pressure.
Figure 1B:
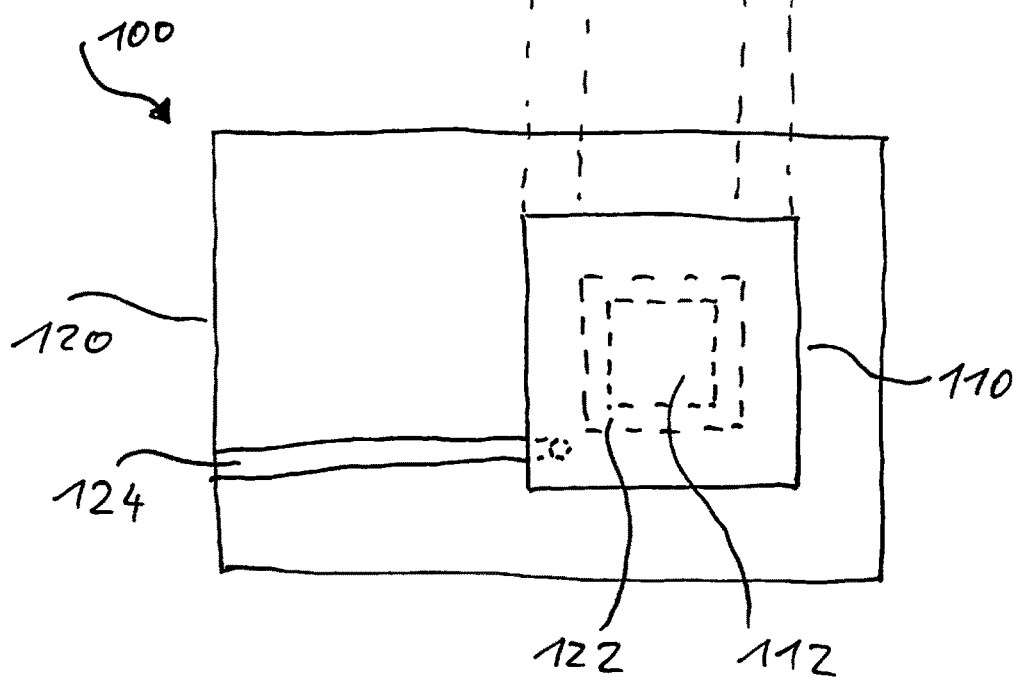

FIGS. 1a and 1b show schematic illustrations of an apparatus 100 for measuring a pressure according to an embodiment. The apparatus 100 comprises a semiconductor die 110 and a circuit board 120. The semiconductor die 110 comprises a micro-mechanical element 112 configured to generate a measurement signal indicating information on an external pressure applied to the micro-mechanical element 112. Further, the semiconductor die 110 comprises an output interface 114 configured to provide the measurement signal. The circuit board 120 comprises at least one electrically-conductive line 124 and an opening 122. The semiconductor die 110 is attached to the circuit board 120 so that the micro-mechanical element 112 faces the opening 122 of the circuit board 120 and the at least one electrically conductive line 124 is connected to the output interface 114 of the semiconductor die 110.

Due to the upside down configuration of the semiconductor die 110 on the circuit board 120, particularly the protection of the output interface 114 against destructive environmental influences can be improved, since the surface for chemical attacks is smaller than for other configurations. Further, the connection between the semiconductor die 110 and the circuit board 120 can be easily manufactured.

The semiconductor die 110 or chip can comprise various structures for implementing a micro-mechanical element. The semiconductor die can comprise a semiconductor substrate (e.g. mainly a silicon substrate, but also a silicon carbide or gallium arsenide substrate can be possible) and one or more metal layers (e.g. copper or aluminum) and/or insulation layers (e.g. silicon dioxide) on top of the semiconductor substrate.

On such a semiconductor die 110, a micro-mechanical element being able to generate a measurement signal indicating information on an external pressure can be implemented in various ways. For example the micro-mechanical element 112 can comprise a membrane or a piezoelectric element, which can be used to generate an electrical signal proportional to or depending on an external pressure applied to the membrane or the piezoelectric element.

In this way, a measurement signal can be provided that indicates information on an external pressure applied to the micro-mechanical element 112. The information on the external pressure can be an electrical signal proportional to the external pressure or a calculated value representing a relative or an absolute pressure or information for calculating a relative or an absolute pressure.

The external pressure can be applied by a gas (e.g. air pressure) or a liquid (e.g. water pressure) being able to access the micro-mechanical element 112 through the opening 122. The actual fluid applying the external pressure to the micro-mechanical element depends on the field of application of the apparatus 100 (e.g. also an application in a chemically-reactive atmosphere may be possible).

The output interface 114 of the semiconductor die 110 may be implemented in various ways. For example, the output interface 114 can comprise at least one output pad of the semiconductor die 110 for providing the measurement signal. Further, the output interface 114 can comprise optionally an amplifier unit for amplifying the measurement signal. Alternatively, or additionally, the output interface 114 can comprise at least one connecting element (e.g. a ball, a solder ball or a bonding wire), electrically connecting (e.g. soldered or wire-bonded) the semiconductor die 110 and the at least one electrically-conductive line 124. Optionally, the output interface 114 of the semiconductor die 110 can comprise one or more additional input and/or output connections or pins (e.g. for providing a supplied voltage to the semiconductor die or for providing additional output signals). Correspondingly, the circuit board can comprise one or more further electrically conductive lines to provide or receive further signals.

The circuit board 120 may be implemented in various ways. The circuit board 120 can comprise at least one insulating carrier layer (e.g. comprising polyimide, polyether, acetone or laminate) and at least one metal layer or a layer comprising electrically-conductive material for implementing the at least one electrically-conductive line (e.g. copper or a conductive polymer). Further, the circuit board 120 comprises an opening 122 or hole. The opening 122 can comprise an arbitrary geometry and/or size. For example, the opening 122 can comprise a circular, polygonal or rectangular geometry or a geometry basically equal to a geometry of the micro-mechanical element 112. For example, the size of the opening 122 can be basically the same as the micro-mechanical element 112 or larger than the micro-mechanical element so that the fluid applying the external pressure to the micro-mechanical element 112 has sufficient access to the micro-mechanical element 112 through the opening 122. In other words, a dimension or expansion of the opening 122 of the circuit board 120 can be larger than a dimension or expansion of the micro-mechanical element (e.g. a footprint of the element in a top view) of the semiconductor die 110 facing the opening 122. The opening 122 can be cut, etched or milled through the circuit board 120, for example.

The semiconductor die 110 is attached (e.g. by soldering or gluing) to the circuit board 120, so that the micro-mechanical element 112 faces (or is turned toward) the opening 122 of the circuit board 120 and the at least one electrically-conductive line 124 is connected to the output interface 114. In other words, the semiconductor die 110 is aligned to the circuit board 120 during the assembly process so that the output interface (e.g. solder ball) is positioned above a contact area of the electrically-conductive line 124 and a footprint area of the micro-mechanical element 112 and a footprint area of the opening 122 overlap at least partly, for example. For example, the semiconductor die 110 can be attached to the circuit board 120 so that an edge of a footprint of the micro-mechanical element 112 can be located directly above an edge of the opening 122 of the circuit board 120 or a center of gravity of the footprint of the micro-mechanical element 112 can be located directly above a center of gravity of the geometry of the opening 122.

The circuit board 120 can be optionally implemented by a printed circuit board with a thickness of more than about 750 μm (or more than about 1 mm or more than about 2 mm). Such a stiff printed circuit board may provide a stable structure in an environment of varying pressures and/or chemically-reactive fluids (gas or liquid). Therefore, an apparatus 100 with increased lifetime and/or increased reliability may be provided.

Alternatively, the circuit board 120 can be a flexible circuit board with a thickness of less than about 500 μm (or less than about 750 μm, less than about 200 μm or less than about 100 μm or between about 35 μm and about 500 μm or between about 50 μm and about 200 μm). The flexible circuit board can comprise a flexible plastic substrate (e.g. polyimide, polyester ether ketone PEEK or a transparent conductive polyester film). Flexible circuit boards may be manufactured using similar components used for rigid or stiff printed circuit boards, allowing the board to conform to a desired shape or to flex during its use. For example, such flexible printed circuits can be made with a photolithographic technology or thin copper strips can be laminated between two layers of polyethylene terephthalate (PET).

For example, the flexible circuit board can comprise an approximately 25 µm polyimide substrate layer and an approximately 30 µm copper metal layer for implementing the at least one electrically-conductive line 124. By using a flexible circuit board, a flexible and space-saving apparatus for measuring pressure can be implemented.

Although, the semiconductor die 110 and especially the output interface 114 can be already well-protected due to the upside down configuration, the protection against aggressive environmental conditions (e.g. chemical reactive fluids) can be improved by inserting underfill material in the gap between the semiconductor die 110 and the circuit board 120. In this way, the at least one connecting element (e.g. solder ball) electrically connecting the semiconductor die 110 and the at least one electrically-conductive line 124 can be surrounded by the underfill material. Various materials can be used for filling the gap between the semiconductor die 110 and the circuit board 120. For example, the underfill material can be selected so that the underfill material (e.g. epoxy, acrylate, polyurethane or silicone) resists the environmental conditions (e.g. physical environment and operating conditions) in a field of application of the apparatus 100 (e.g. at air, in water or in chemical reactive liquids) more than about 100 times (or more than about 10 times, more than about 1,000 times or more than about 10,000 times) longer than a material of the connecting element (e.g. copper, aluminum, tungsten or solder) without destructive damages, for example. In other words, the underfill material can be adapted to the environmental conditions, so that a destructive attack to the semiconductor die 110, the output interface 114 and/or a connecting element of the output interface 114 may be avoided or significantly reduced.

Optionally, alternatively or additionally to one or more of the aspects mentioned above, the apparatus 100 can be coated by a coating material in order to increase the resistivity against rough environmental conditions. In other words, the semiconductor die 110 and the circuit board 120 at least within a predefined distance to the semiconductor die 110 can be coated with a coating material (e.g. comprising or consisting of epoxy, polyurethane or plasma carbon). The coating material can be selected so that the coating material resists the environmental conditions (e.g. physical environment and operating conditions) in a field of application of the apparatus 100 more than about 100 times (or more than about 10 times, more than about 1,000 times or more than about 10,000 times) longer than a material of the connecting element. The coating material can cover also the micro-mechanical element 112, if the micro-mechanical element 112 is still able to provide a measurement signal with information with sufficient accuracy. Alternatively, the micro-mechanical element 112 and/or the opening 122 can be left open or exposed by the coating material.

Apart from the micro-mechanical element 112 and/or the opening 122, the semiconductor die 110 and the circuit board 120 within the predefined distance can be completely covered by the coating material, for example.

Figure 2C:
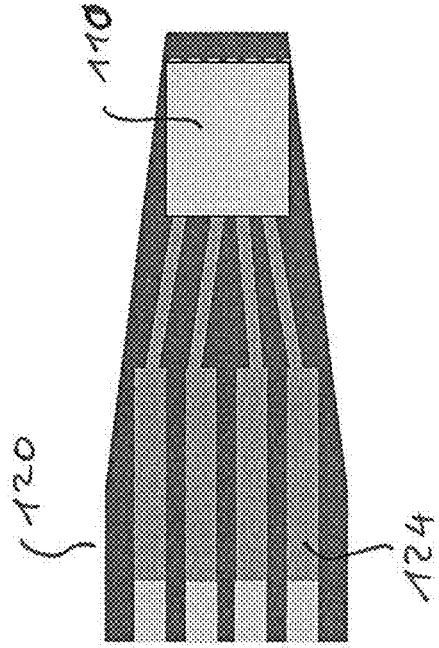

For example, the predefined distance can range from the semiconductor die 110 (e.g. a center or the edges) to a connecting area (e.g. for connecting the apparatus to a unit further processing the measurement signal). Only this connecting area of the one or more electrically conductive lines 124 may be left open for providing a possibility for connecting the apparatus to other electronic circuits. Alternatively, the predefined distance can be selected so that a part of the apparatus 100 located in a rough environment (e.g. inside a battery) is coated by a coating material and another part of the apparatus 100 located in a relaxed environment (e.g. outside the battery) is not covered by the coating material. In other words, the predefined distance can be selected depending on the field of application of the apparatus 100. Further alternatively, the circuit board 120 can be coated by the coating material only in the direct area (e.g. up to less than one time a dimension of the semiconductor die) of the semiconductor die 110. FIGS. 2a to 2g show an example for the manufacturing of an apparatus for measuring a pressure using underfill material and coating material. In this case, a semiconductor die 110 with a micro-mechanical element 112 and a plurality of solder balls 214 of an input and output interface is provided as well as a circuit board 120 comprising a plurality of electrically-conductive lines 124 (e.g. four lines in this example) for establishing an electrical connection to the solder balls 214 of the semiconductor die 110 and an opening 122 in the middle of the area arranged for the semiconductor die 110 as is shown in FIG. 2a. In other words, a flex circuit (flexible circuit board) and a chip can be provided. This circuit board 120 can comprise a nickel-gold plating at the contact, a polyimide solder stop and a pressure port hole (opening), for example. The semiconductor die 110 can be a wafer-level ball grid array package pressure sensor (e.g. of a side of less than 5 mm×5 mm and solder balls smaller than 500 µm).

Figure 2D:
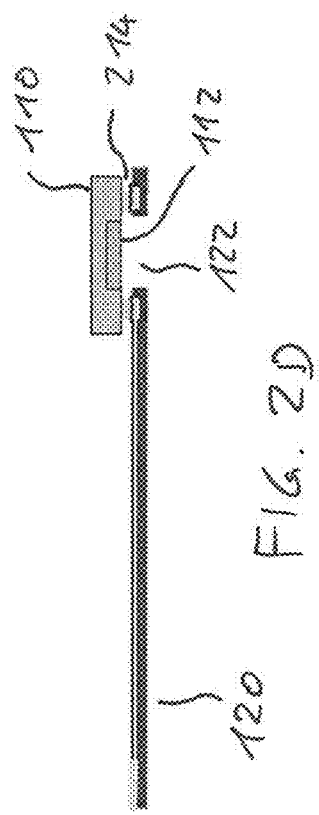

The semiconductor die 110 can be aligned to the opening 122 as shown in FIG. 2b. The flex circuit or flexible circuit board 120 can comprise 25 µm polyimide and 30 µm copper or another layer stack, for example. The semiconductor die 110 can be attached to the circuit board 120 by flip chip assembly and reflow as is shown in a top view in FIG. 2c and a cross-section in FIG. 2d. Due to the upside-down configuration, the backside of the semiconductor die 110 is visible in the top view of FIG. 2c and the cross-section of FIG. 2d shows the solder balls 214 after the reflow process implementing an electrically-conductive connection between the semiconductor die 110 and the plurality of electrically-conductive line 124.

Further, the gap between the semiconductor die 110 and the circuit board 120 is filled by an underfill material 216 as is shown in a top view in FIG. 2e and in a cross-section in FIG. 2f. In this way, a selective protection can be provided with the underfill. The membrane (micro-mechanical element) can be kept gel-free (e.g., free from underfill material), for example.

With the underfill material, a chemical inert underfill (e.g. by using epoxy, acrylate, polyurethane or silicone) can be implemented. This may provide a stable and unreactive configuration under specific conditions (e.g. in a chemically reactive environment).

Optionally, the semiconductor die 110 and at least a part of the circuit board 120 can be covered or coated by a coating material 230. For example, the whole device (e.g. except for contact areas of the circuit board and/or the micro-mechanical element) can be coated with expoxy, parylene or plasma carbon as it is shown in FIG. 2g. In other words, the semiconductor die 110 can be hermetically surrounded by an underfill material in combination with a coating material so that the micro-mechanical element 112 can be only accessible for the external pressure through the opening 122 of the circuit board 120. In this way, a chemical stable pressure sensor package can be implemented, for example.

Alternatively to the coating by a coating material and/or filling the gap with underfill material, the semiconductor die 110 can be covered by a glob top. A glob top can be a variant of a conformal coating. It can be implemented by a drop of resin deposited over a semiconductor chip to provide mechanical support and exclude contaminations. In this way, the semiconductor die and/or the output interface of the semiconductor die can be protected against aggressive environmental conditions easily.

Figure 3:
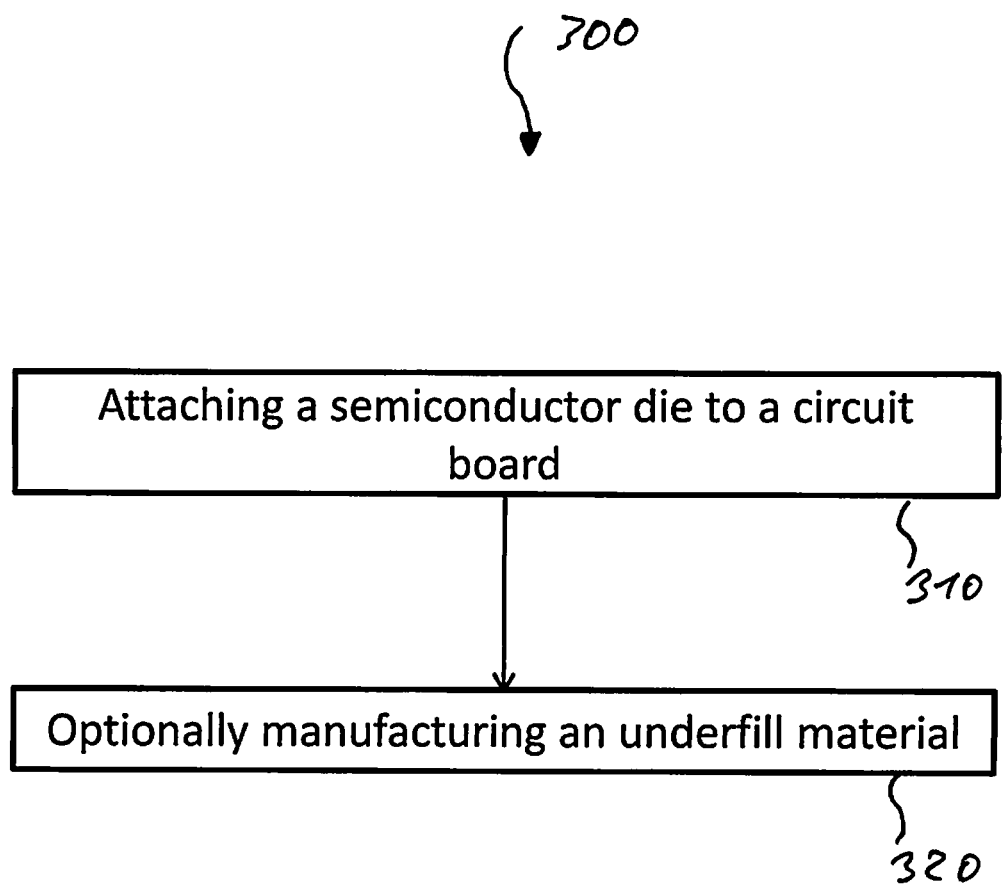
FIG. 3 shows a flowchart of a method for manufacturing an apparatus for measuring a pressure.

FIG. 3 shows a flowchart of a method 300 for manufacturing an apparatus for measuring a pressure according to an embodiment. The method 300 comprises attaching at 310 a semiconductor die comprising a micro-mechanical element to a circuit board comprising at least one electrically conductive line and an opening, so that the micro-mechanical element faces the opening of the circuit board and the at least one electrically conductive line is connected to an output interface of the semiconductor die. Further, the semiconductor die is configured to generate a measurement signal indicating information on an external pressure applied to the micro-mechanical element. The output interface of the semiconductor die is configured to provide the measurement signal.

Further, the method 300 can optionally comprise manufacturing at 320 an underfill material surrounding at least one connecting element electrically connecting the semiconductor die and the at least one electrically-conductive line. The underfill material can be selected so that the underfill material resists the environmental conditions in a field of application of the apparatus more than 100 times longer than a material of the connecting element.

Further, the explanations given above (e.g. relating to FIGS. 1, 2a to 2g) are correspondingly applicable to the method 300.

The method 300 can comprise one or more further optional steps implementing one or more aspects mentioned in connection with the proposed concept or one or more embodiments described above.

Figure 4:
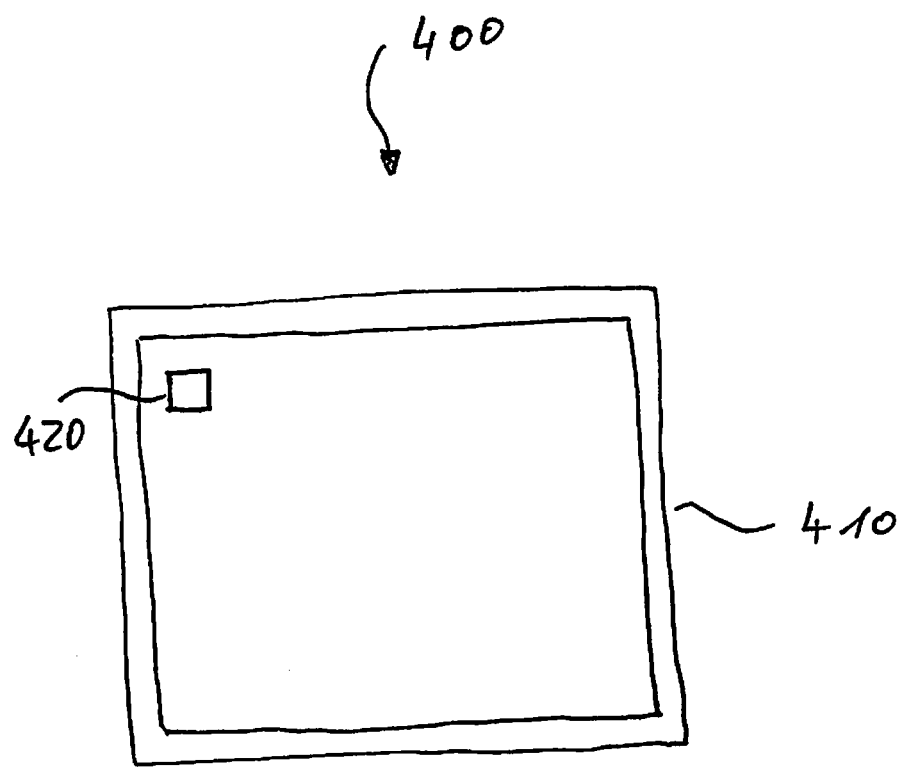
FIG. 4 shows a schematic illustration of a battery.

FIG. 4 shows a schematic illustration of a battery 400 according to an embodiment. The battery 400 comprises a hermetically sealed or a hermetically sealable enclosure 410 and an apparatus 420 for measuring a pressure within the enclosure 410. The apparatus 420 is located inside the enclosure 410.

By placing the apparatus for measuring a pressure inside the battery enclosure, an increase of the pressure inside the enclosure (e.g. due to erroneous behavior) can be detected very early. Consequently, counter measures also can be started very early to avoid a destruction of the battery and/or the safety of usage can be improved.

The enclosure 410 can be sealed hermetically, which may mean that the enclosure 410 cannot be opened or comprise removable parts for opening the enclosure 410 without destroying the enclosure 410. Alternatively, the enclosure 410 can be hermetically sealable, which may mean that the enclosure 410 comprises one or more openings with a closure, closing or locking device configured to hermetically seal the one or more openings.

The apparatus 420 for measuring the pressure within the enclosure 410 is located inside the enclosure, which may mean that at least the circuitry and/or mechanism to generate an electrical measurement signal indicating information on a pressure within the enclosure 410 is located inside the enclosure 410. However, electrical connections to the apparatus 420 or electrical connections of the apparatus 420 can lead through the enclosure 410 (e.g. through sealable openings or cast integrally with the enclosure).

Alternatively, the apparatus 420 can be located completely inside the battery and may provide the measurement signal wirelessly.

The apparatus 420 for measuring a pressure can be based on various pressure measurement concepts (e.g. implanted by a manometer or a micro-mechanical device). For example, the apparatus 420 can comprise a semiconductor die comprising a micro-mechanical element configured to generate a measurement signal indicating information on a pressure within the enclosure applied to the micro-mechanical element. In this case, the semiconductor die can further comprise an output interface for providing the measurement signal to at least one electrically-conductive line (e.g. wire) leading through the enclosure 410 to an outside of the enclosure 410 (e.g. to be connected to a device further processing or using the measurement signal).

Optionally, the apparatus 420 for measuring a pressure may be implemented according to the concept described above or one or more embodiments described above or shown in FIGS. 1 to 3. In this example, the circuit board can lead through the enclosure 410 of the battery 400 so that at least the measurement signal can be provided to the outside. By using a flexible circuit board, the apparatus 420 and the part of the apparatus leading through the enclosure (e.g. an opening of the enclosure) may be adapted to the geometry of the battery 400 in a flexible way. By using optionally underfill material and/or coating material or a globe top as supposed above, the apparatus 420 for measuring a pressure within the enclosure 410 of the battery may resist the rough environmental conditions inside the battery for a long time.

Additionally, the battery 400 can comprise one or more additional sensors (e.g. a temperature sensor) within the enclosure 410 of the battery 400 in order to measure more parameters inside the battery 400. In this way, a malfunction of the battery 400 may be detected earlier.

The battery can be a non-chargeable battery or a rechargeable battery (e.g. a lithium-ion battery, a nickel-cadmium battery, an alkaline battery or a lead acid battery).

For example, a lithium-ion battery 500 is shown in FIG. 5. The battery 500 can comprise an enclosure 510. The enclosure 510 can comprise a container and a cover of the container, which is able to hermetically the container. This enclosure 510 can comprise at the top side an opening for a first electrode (e.g. copper) 502 with a sealing 503 and an opening for a second electrode 504 with a sealing 505 providing the different electrical potentials to the outside of the battery 500. Further, the battery 500 can comprise an opening 506 for infilling electrolyte with a ball locking device. Further, the enclosure 510 can comprise a blowout disc 507. Inside the enclosure 510, the battery 500 can comprise a twisted stack 501 of electrodes, active material, separator, active material and/or electrodes. Further, a solvent can be inside the enclosure 510 and/or the twisted stack 501 can be conducting salt soaked.

In this example, an apparatus 520 for measuring a pressure can be located at different positions. For example, an apparatus 520 can be led through or may run through the edge of the cover of the enclosure 510, can be led through the electrode sealing, can be led through an edge of the electrode sealing or can be used as a closure for a filler opening. In the latter case, the apparatus 520 is located outside the enclosure 510 while in the other cases, the apparatus 520 is located inside the enclosure 510 of the battery 500. If a flexible circuit board is used, a lead through of the thin sensor flex line (electrically-conductive line) can be implemented at existing sealings of the battery cover.

While FIG. 5 shows the apparatus 420 for measuring a pressure inside the battery installed at different locations of the battery, it is to be understood that in other embodiments the apparatus 420 for measuring a pressure inside the battery may be installed only at one of the different locations shown in FIG. 5 or at more than one of the different locations.

For example, according to some embodiments, only one apparatus 420 may in some embodiments be provided. The apparatus 420 can, for example, be installed to cover an opening of the battery such that the battery is hermetically sealed by the apparatus 420 as shown in FIG. 5. In these embodiments, the circuit board 120 can extend substantially parallel to a main surface of the battery cover.

In other embodiments, the apparatus 420 for measuring a pressure inside the battery can be installed to be guided through a sealing of the battery cover as shown in FIG. 5. In these embodiments, the circuit board 120 can extend substantially vertical to a main surface of the battery cover from the outside of the battery to the inside of the battery.

In some embodiments, the battery comprises a pouch package, wherein the apparatus for measuring a pressure is assembled by hot melt adhesives. Further, the sensor part of the apparatus (e.g. semiconductor die) is located inside the battery and the contact part of the apparatus (e.g. part of the circuit board) is located outside the battery.

Further, in some embodiments, the battery is a hard case cell and the apparatus comprises a flexible circuit board fixed on a plug of the battery. In other words, in the case of a hard case cell, a thin flexprint can be fixed on a kind of plug (with whatever shape that is possible, e.g. cylindrical, flat blade).

Alternatively or additionally, the battery is a hard case cell and the apparatus comprises a flexible circuit board fixed on a battery electrode and uses the same hole in the hard case cell as the battery electrode. In other words, the flexprint can be fixed on the battery electrode and use the same hole in the hard case package as the battery electrode.

Some embodiments relate to a battery being a hard case cell and the apparatus comprising a flexible circuit board folded with a metal cap sealing of the hard case cell. In other words, the flexible thin package can be folded with the metal cap sealing of the hard case cell.

In some embodiments, the board is a very thin flexible circuit board, so that it can be integrated in many possible battery shapes. Further, as it is very thin, it can be assembled through very gentle gap of the battery, which may be important so that the battery can be 100% sealed even with integrated sensors, for example. The sensor can be manufactured as a distinct device, independent from the battery manufacturing. Therefore the sensor can be a possible option—the battery manufacturer can also offer batteries without sensors. There can be assembly embodiments, in which the sensor can be easily replaced, e.g. if the flexible sensor is fixed at a kind of plug that can be plugged into the battery. In case of flexible battery packages ("pouch cells") the sensor can be laminated into the foil package with help of typically hot-melt adhesive, for example. The sensor part can be inside the battery package and the electrical contacts can be outside the package. The sealing can be implemented by the hot-melt adhesive.

In this way, a pressure sensor (as well as additionally a temperature sensor) can be implemented within a battery. For example, a lithium battery for electro mobility can be provided.

Some embodiments relate to a chemical resistant pressure sensor package or a fluid stable pressure sensor package. Such a gas pressure sensor may be applicable in a chemically-reactive fluid, e.g. inside a lithium-ion battery. In this way, a possible development of a gas overpressure inside the battery can be detected, which may lead to a destruction and/or a combustion. In this way, an active countermeasure for self-secure lithium-ion batteries or others may be provided.

Nowadays fluids often are used inside batteries, which may be heated or may evaporate by a temperature increase caused by local defects inside the electrode stacks, for example. Through this, the battery may expand and may burst or explode. Thus, the organic electrolyte may catch fire and the battery may burn off due to the possible oxygen access. Based on a sensor or an apparatus according to the proposed concept, an overheating of a battery can be detected significantly earlier than with a temperature sensor attached at the outside of the battery, for example. An emergency shutdown may be implemented if an overheating or an overpressure within the battery is detected.

Due to an overload, a fail function and/or a shortcut, a lithium polymer battery cell may generate gas (HF, hydrogen fluoride) and may generate a strong internal pressure, for example. It may be desired to detect gas generation in a very early state with the help of pressure sensors or gas sensors for being able to switch off the battery very early.

By using the described concept, a safety battery technology (e.g. for electromobility) may be developed.

The proposed concept provides a possibility to place a sensor within a battery cell. In this way, a pressure increase within the cell can be detected at an early stage.

A pressure sensor chip suitable for a desired pressure range can be used. A suitable configuration and connection technique can be provided by the described concept.

According to the described concept, a flex print based pressure sensor package can be implemented, which may be stable or more resistant especially against chemical exposure by implementing a chemical stable underfiller as well as optionally an additional complete coating.

According to an aspect, a micro-mechanical element based sensor chip can be used, which is mounted or attached to a flexible circuit so that the sensor barrier (micro-mechanical element) is free of (or only slightly affected by) mechanical stress above an opening or in the substrate (of the circuit board). Further, or alternatively, a flip chip configuration and usage of a chemical stable underfill can be implemented in order to protect the chip already within the package to a large extent against chemical influences. Optionally, the whole package can be coated with a chemical stable layer (e.g. parylene or plasma deposited carbon layer).

Embodiments can further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein the instructions perform some or all of the acts of the above-described methods. The program storage devices can be, e.g., digital memories, magnetic storage media such as magnetic disks and magnetic tapes, hard drives, or optically readable digital data storage media. The embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An apparatus for measuring a pressure, the apparatus comprising:
   a semiconductor die comprising a micro-mechanical element configured to generate a measurement signal indicating information on an external pressure applied to the micro-mechanical element, wherein the semiconductor die comprises an output interface configured to provide the measurement signal; and
   a circuit board comprising at least one electrically conductive line and an opening disposed through the circuit board, wherein the semiconductor die is attached to the circuit board, so that the micro-mechanical element is disposed outside the opening of the circuit board to face the opening of the circuit board and the at least one electrically conductive line is connected to the output interface.

2. The apparatus according to claim 1, wherein the circuit board is a flexible circuit board with a thickness of less than about 500 μm.

3. The apparatus according to claim 1, wherein the output interface of the semiconductor die comprises at least one connecting element electrically connecting the semiconductor die and the at least one electrically conductive line.

4. The apparatus according to claim 3, wherein the at least one connecting element is surrounded by an underfill material, wherein the underfill material resists the environmental conditions in a field of application of the apparatus more than about 100 times longer than a material of the connecting element.

5. The apparatus according to claim 4, wherein the underfill material comprises or consists of epoxy, acrylate, polyurethane or silicone.

6. The apparatus according to claim 1, wherein the semiconductor die and the circuit board at least within a predefined distance to the semiconductor die are coated with a coating material, wherein the coating material resists the environmental conditions in a field of application of the apparatus more than about 100 times longer than a material of the connecting element.

7. The apparatus according to claim 6, wherein the coating material comprises or consists of epoxy, Parylene or plasma carbon.

8. The apparatus according to claim 1, wherein the semiconductor die is covered by a glob top.

9. The apparatus according to claim 1, wherein the semiconductor die is hermetically surrounded by a glob top or an underfill material in combination with a coating material, so that the micro-mechanical element is only accessible for the external pressure through the opening of the circuit board.

10. The apparatus according to claim 1, wherein a dimension of the opening of the circuit board is larger than a dimension of the micro-mechanical element of the semiconductor die facing the opening.

* * * * *